US010021671B2

(12) United States Patent
Kazmi et al.

(10) Patent No.: US 10,021,671 B2
(45) Date of Patent: *Jul. 10, 2018

(54) METHOD AND ARRANGEMENT IN A TELECOMMUNICATION SYSTEM

(71) Applicant: IDTP HOLDINGS, INC., Wilmington, DE (US)

(72) Inventors: Muhammad Kazmi, Bromma (SE); Robert Baldemair, Solna (SE); Magnus Stattin, Spanga (SE)

(73) Assignee: IDTP Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,228

(22) Filed: Jul. 6, 2017

(65) Prior Publication Data

US 2017/0311283 A1    Oct. 26, 2017

Related U.S. Application Data

(63) Continuation of application No. 15/221,048, filed on Jul. 27, 2016, now Pat. No. 9,736,813, which is a
(Continued)

(30) Foreign Application Priority Data

Aug. 22, 2006    (SE) ....................... 0601716

(51) Int. Cl.
*H04W 72/00*    (2009.01)
*H04W 68/02*    (2009.01)
(Continued)

(52) U.S. Cl.
CPC ......... *H04W 68/02* (2013.01); *H04W 68/005* (2013.01); *H04W 68/025* (2013.01);
(Continued)

(58) Field of Classification Search
USPC .............. 370/329, 335; 455/452.1, 450, 436
See application file for complete search history.

(56) References Cited

U.S. PATENT DOCUMENTS 7,194,277 B2    3/2007 Farnsworth
8,817,737 B2 *  8/2014 Lee ................. H04L 5/0007
                                                     370/330
(Continued)

FOREIGN PATENT DOCUMENTS

EP    1515575 A1    3/2005
JP    2003-259448 A    9/2003
WO    WO 2007/078172 A2    7/2007

OTHER PUBLICATIONS

3rd Generation Partnership Project (3GPP), R1-060006, "Monitoring of Paging Information for Evolved UTRA Scalable Bandwidth", Sharp, 3GPP TSG-RAN WG1 LTE Ad Hoc Meeting, Helsinki, Finland, Jan. 23-25, 2006, pp. 1-4.

(Continued)

*Primary Examiner* — David Q Nguyen
(74) *Attorney, Agent, or Firm* — Condo Roccia Koptiw LLP

(57) ABSTRACT

There is provided a method for use in a user equipment when the user equipment is in idle mode or any other low activity state, and when the user equipment bandwidth is smaller than the cell transmission bandwidth. The method comprises the steps of determining a paging position of the user equipment in the frequency domain; receiving, from the network, paging information within the user equipment reception bandwidth; and changing, if indicated by the network, the paging position of the user equipment within the cell transmission bandwidth.

20 Claims, 3 Drawing Sheets

Related U.S. Application Data continuation of application No. 14/633,942, filed on Feb. 27, 2015, now Pat. No. 9,439,170, which is a continuation of application No. 12/304,640, filed as application No. PCT/EP2007/007392 on Aug. 22, 2007, now Pat. No. 9,002,385.

(51) Int. Cl.
*H04W 68/00* (2009.01)
*H04W 72/02* (2009.01)
*H04W 76/28* (2018.01)
*H04W 72/04* (2009.01)

(52) U.S. Cl.
CPC ........... *H04W 72/02* (2013.01); *H04W 76/28* (2018.02); *H04W 72/0453* (2013.01)

(56) References Cited

U.S. PATENT DOCUMENTS

| | | | |
|---|---|---|---|
| 9,414,356 B2* | 8/2016 | Kim | H04W 68/025 |
| 2003/0003920 A1* | 1/2003 | Sebastian | H04W 28/20 |
| | | | 455/452.1 |
| 2003/0036384 A1 | 2/2003 | Chen et al. | |
| 2003/0219020 A1 | 11/2003 | Honary et al. | |
| 2004/0002334 A1* | 1/2004 | Lee | H04W 36/0083 |
| | | | 455/436 |
| 2004/0125772 A9* | 7/2004 | Wu | H04W 16/12 |
| | | | 370/335 |
| 2004/0229626 A1* | 11/2004 | Yi | H04W 76/02 |
| | | | 455/450 |
| 2006/0148493 A1 | 7/2006 | Narasimha et al. | |
| 2008/0031160 A1 | 2/2008 | Ryu et al. | |
| 2008/0081645 A1 | 4/2008 | Kim et al. | |
| 2008/0220766 A1 | 9/2008 | Bertho et al. | |
| 2009/0010213 A1* | 1/2009 | Yamada | H04B 1/7143 |
| | | | 370/329 |
| 2009/0010219 A1* | 1/2009 | Lee | H04W 28/20 |
| | | | 370/329 |
| 2010/0062795 A1 | 3/2010 | Lee | |

OTHER PUBLICATIONS

3rd Generation Partnership Project (3GPP), R1-061683, "Physical Allocation of PCH for 20MHz Operating Bandwidth", Sharp, 3GPP TSG-RAN WG1 LTE Ad-Hoc, Cannes, France, Jun. 27-30, 2006, pp. 1-6.

3rd Generation Partnership Project (3GPP), R2-060837, "Paging Channel Structure for E-UTRA Downlink", NTT DoCoMo, Fujitsu, Mitsubishi Electric, NEC, Toshiba Corporation, Athens, Greece, Mar. 27-31, 2006, pp. 1-5.

3rd Generation Partnership Project (3GPP), R2-062128, "Paging Mechanism in E-UTRAN", Ericsson, 3GPP TSG-RAN WG2 (Radio) Meeting #54, Tallinn, Estonia, Aug. 28-Sep. 1, 2006, 4 pages.

* cited by examiner

METHOD AND ARRANGEMENT IN A TELECOMMUNICATION SYSTEM

This application is a continuation of U.S. patent application Ser. No. 15/221,048, filed Jul. 27, 2016, which is a continuation of U.S. patent application Ser. No. 14/633,942 filed on Feb. 27, 2015, which issued as U.S. Pat. No. 9,439,170 on Sep. 6, 2016; which is a continuation of U.S. patent application Ser. No. 12/304,640 filed on Oct. 8, 2009, which issued as U.S. Pat. No. 9,002,385 on Apr. 7, 2015; which is the National Stage Entry under 35 U.S.C. § 371 of Patent Cooperation Treaty (PCT) Application No. PCT/EP2007/007392, filed on Aug. 22, 2007; which claims the benefit of Swedish Patent Application No. 0601716.4, filed Aug. 22, 2006; all of the contents of which are incorporated by reference as if fully set forth herein.

TECHNICAL FIELD

The present invention relates to methods and arrangements in a telecommunication system, in particular to methods and arrangements for paging transmissions in variable bandwidth scenarios.

BACKGROUND

In current systems such as, e.g., the UMTS Terrestrial Radio Access Network (UTRAN) the reception bandwidth of user equipments (UEs) is the same as the cell transmission bandwidth. However, in Evolved UTRAN (E-UTRAN) the system may employ variable bandwidths. Further, the minimum bandwidth that is applied by a user equipment can be smaller than the network bandwidth. For instance, a typical case in future releases of E-UTRAN would be a 20 MHz user equipment operating in a system comprising a 30 MHz or 40 MHz cell transmission bandwidth. One additional important aspect of E-UTRAN is the potentially very large number of active and idle mode users per cell. This is partly due to the possibly large bandwidth that can be applied (10 MHz and 20 MHz cases) and partly because of the packet-oriented design. Hence, the number of paging messages per cell is envisioned to be much larger compared to previous radio access networks, e.g. the UTRAN or GERAN system, and, as a consequence, paging in E-UTRAN may consume more resources than in other systems.

In E-UTRAN, no radio resources are allocated to a user equipment in idle mode and, thus, there is no RRC connection maintained (see, e.g., the documents 3GPP TS25.304, "UE procedures in idle mode and procedures for cell reselection in connected mode" and 3GPP TS25.331, "Radio Resource Control Protocol Specifications" issued by the 3rd Generation Partnership Project). Therefore, the user equipment is informed about an incoming call by help of a paging indication. In case of an incoming call the network can page the user equipment, whereby the information relates to the call only at a well-defined instance, i.e. once per DRX cycle. This implies that user equipments need to monitor the paging indication once per DRX cycle. As E-UTRAN fully employs packet switching technology, it requires efficient paging mechanisms since the packet arrival (i.e. incoming calls) is bursty.

According to current solutions the paging is sent in the centre of the transmission bandwidth. This solution works well for user equipments having a bandwidth that is the same as the cell transmission bandwidth. However, in some E-UTRAN scenarios the bandwidth of the user equipment is smaller than the network bandwidth. For such scenarios a user equipment must retune its receiver each time it needs to listen to the paging. Further, current solutions also lead to less flexibility in terms of resource allocation from the network perspective.

SUMMARY OF INVENTION

It is thus perceived to be a problem to achieve a dynamic allocation of resources for paging that is applicable also in scenarios where the bandwidth of a user equipment is smaller than the network bandwidth and where the user equipment only can use limited positions in the frequency domain.

It is therefore the basic idea of the present invention to achieve a method and arrangement in a user equipment operating with a bandwidth that is smaller than its cell transmission bandwidth, said method including the steps of indicating its paging position in the frequency domain to the network; receiving paging information, or an appropriate message within the UE reception bandwidth, from the network; changing, if indicated by the network, its paging position within the cell transmission bandwidth. The method may further include the steps of receiving and applying selection probabilities for different possible paging positions within the cell transmission bandwidth that are broadcasted by the network in order to ensure for a cell an even distribution of user equipments in the frequency domain.

According to a second aspect of the present invention, there is also provided a method in a network unit, the method comprising the step of positioning a user equipment at a particular position in the frequency domain for receiving paging when the user equipment is in idle mode or any other low activity state.

According to third and fourth aspects of the present invention, a user equipment and a network unit are provided for performing the methods of the first and second aspects, respectively, as outlined above.

The present invention implies the advantage to ensure an equal distribution in the frequency domain of paging positions of user equipments within the cell transmission bandwidth.

It is a further advantage of the present invention that it ensures an efficient usage of resources by preventing the need of sending multiple copies of paging indications and paging messages.

BRIEF DESCRIPTION OF THE DRAWINGS

For a better understanding of the present invention, and to show more clearly how it may be carried into effect, reference will now be made, by way of example, to the following drawings, in which.

DETAILED DESCRIPTION

Figure 1:
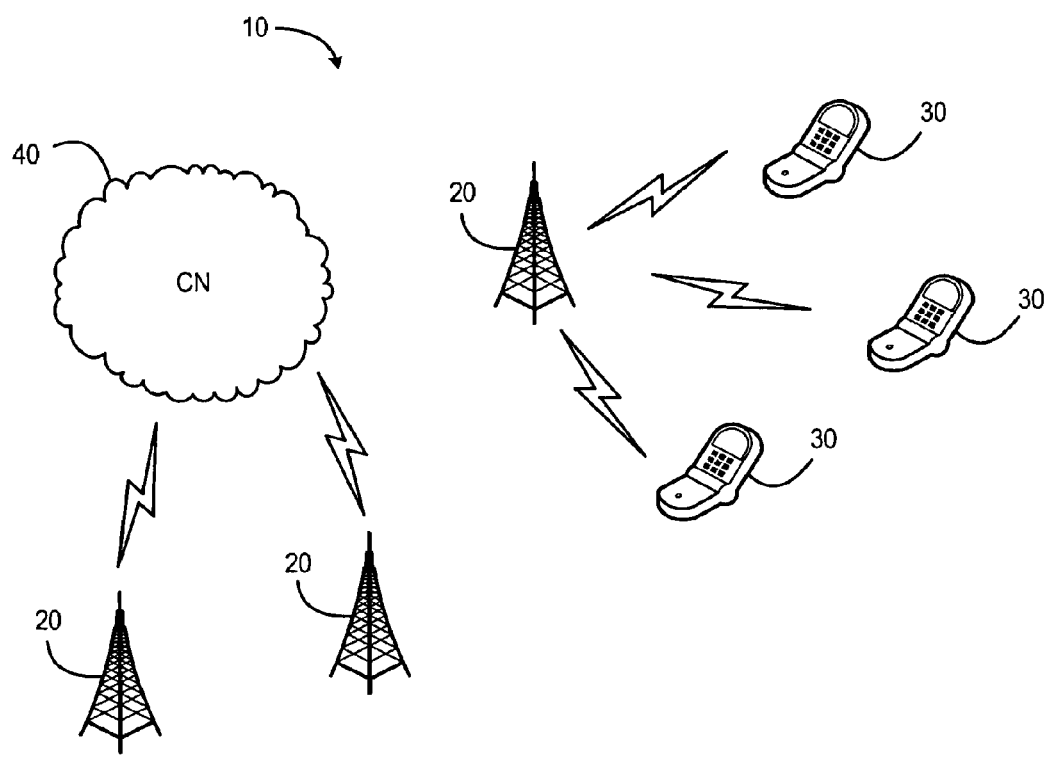
FIG. 1 shows a cellular radio communication network.

FIG. 1 shows a cellular radio communication network 10. The network 10 comprises a plurality of network units 20, each of which transmits communications to a separate cell in the network 10. Network units 20 are also referred to as base stations in the following description. Within each cell, user equipments (UEs) 30 receive transmissions from the respective network unit 20. Each of the network units 20 receive information from a core network (CN) 40, which controls the operation of the network 10.

Figure 2:
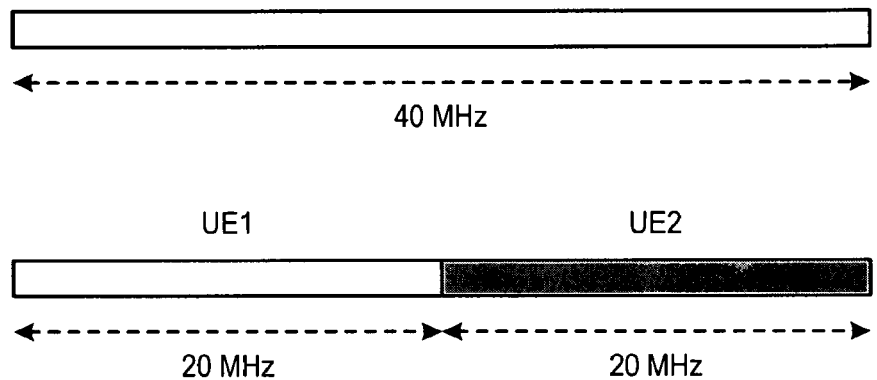
FIG. 2 illustrates an example of locations in the frequency domain of a 20 MHz UE in a 40 MHz cell transmission bandwidth.

The present invention relates to the scheduling of paging indications and paging messages to user equipments having a bandwidth that is smaller than the cell transmission bandwidth. The user equipment shall be positioned in the frequency domain at limited positions. By means of a non-limiting example, which is applied in the following description, in E-UTRAN the minimum UE bandwidth capability is 20 MHz and the maximum cell bandwidth in future will be larger than 20 MHz. Hence, as an example, in E-UTRAN a 20 MHz user equipment within a 40 MHz cell bandwidth shall be placed at a limited number of positions (e.g. two or three positions). For this purpose the user equipment tunes its receiver to a specific position in the frequency domain within a cell. FIG. 2 shows an example of 20 MHz UE with two different positions in the frequency domain: lower (left) 20 MHz or upper 20 MHz (right).

Figure 3:
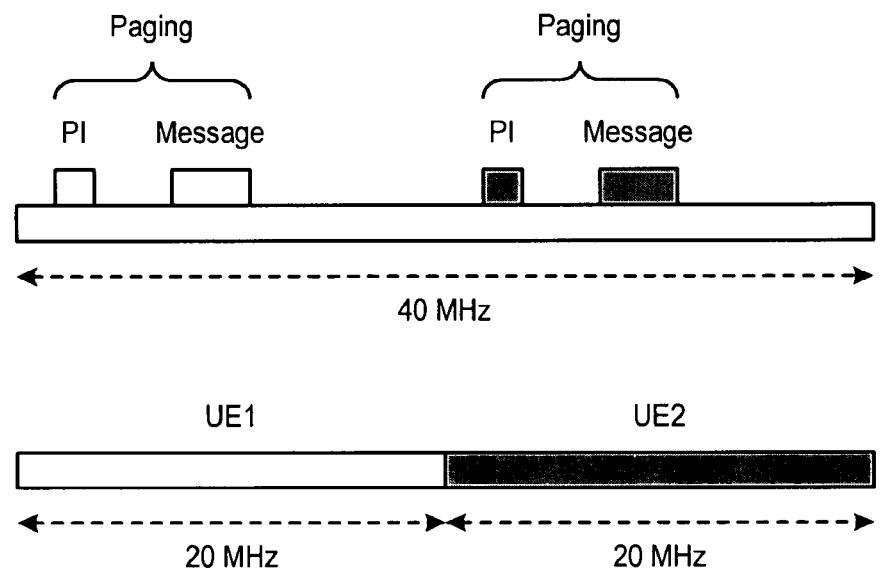
FIG. 3 shows an example of paging of a 20 MHz UE in a 40 MHz cell transmission bandwidth.

Regarding paging transmission, both the paging indicator and the paging message are sent within the UE reception bandwidth without any duplication (the paging can be sent at any position in the frequency domain within the UE reception bandwidth). Since the user equipment is paged within its reception bandwidth it is prevented that the user equipment needs to re-tune its receiver. FIG. 3 shows the transmission of paging in case of two UE positions.

Alternatively, if the paging is duplicated, or multiple pagings are sent in case of more than two UE positions, the user equipment would be allowed to receive the paging irrespective of its position and without the need for any re-tuning of its receiver. In order to allow the above solution to work the network needs to be aware of the current paging position of the user equipment within the cell transmission bandwidth, which is larger than the UE bandwidth. In a first step the user equipment needs to be positioned at a certain paging position.

The following discloses by means of non-limiting examples several embodiments to position a user equipment:

According to one embodiment for positioning of a user equipment in the frequency domain, a certain positioning rule is applied, e.g. a probabilistic or a hash-based rule.

1) When applying, for instance, a probabilistic rule, the user equipment selects its paging position out of a number N of possible positions with a certain probability that is associated to each position. Thus, a position that is denoted with a positioning index $k \, .epsilon. \, [0, 1, \ldots N-1]$ is selected by the user equipment with a probability $P.sub.k$. In a special case the probabilities for all positions are the same, i.e. $P.sub.0=P.sub.1= \ldots P.sub.N-1=1/N$. In case of two UE positions, the above special case would imply that statistically half of the user equipments are positioned on the lower half of the spectrum and half of the user equipments are positioned on the upper half of the spectrum.

2) Another conceivable positioning rule is a hash rule that is based on a suitable hash function. In this rule user equipments are positioned in the frequency domain according to their identities (ID). Hashing of the UE identifier maps then the UE identity on one of the available positions. One simple example of hashing function is a modulus operation, whereby a user equipment is positioned in the frequency domain according to a UE-specific identifier (UE_ID). For instance, out of a number N of possible positions the user equipment can derive its positioning index k by using an operation k=(UE_ID) mod N. A UE-specific identifier is, e.g., the IMSI; however, any other well-defined UE-specific identity can be used.

In another hash-based rule, the groups of UE identities can be mapped onto paging positions. UE identities can be hashed onto paging groups (e.g. 32-bit UE_ID to 12 bit Paging Group ID) which are, in turn, deterministically distributed over the available paging positions.

According to another embodiment for positioning a user equipment in the frequency domain, the UE positioning can be performed either by a UE-based selection, i.e. the user equipment places itself independently at a certain position, or by a network-based selection. As the paging consumes a certain amount of resources it is beneficial to equally distribute the idle mode user equipments, i.e. those listening to the paging, within the different positions in the frequency domain. The network is fully aware of the radio resource situation and can therefore indicate in the system information (transmitted on the broadcast channel) the preferred paging positions where the user equipment shall tune itself. Depending on the type of information that is sent in the system information there are different possible ways to realize this mechanism, whereof the following discloses two non-limiting examples:

1) Well Defined Positions: The broadcasted information may comprise associations between the range of UE identities, or groups of UE identities, and the paging positions. The UE groups that are to be assigned to different paging positions can be decided on by help of their identities, subscription, intended services, or any other suitable criteria.

2) Broadcast Selection Probabilities: The system information may comprise selection probabilities for different paging positions. The probabilities could be changed dynamically owing to the radio resource usage in different locations. This method provides an increased flexibility. For instance, if needed, a non-uniform UE distribution can also be achieved by changing the access probabilities. This means that a user equipment shall automatically be placed at the paging position that is optimal from a resource usage view point. Thus, this allows preventing a resource bottleneck at the time of paging.

Figure 4:
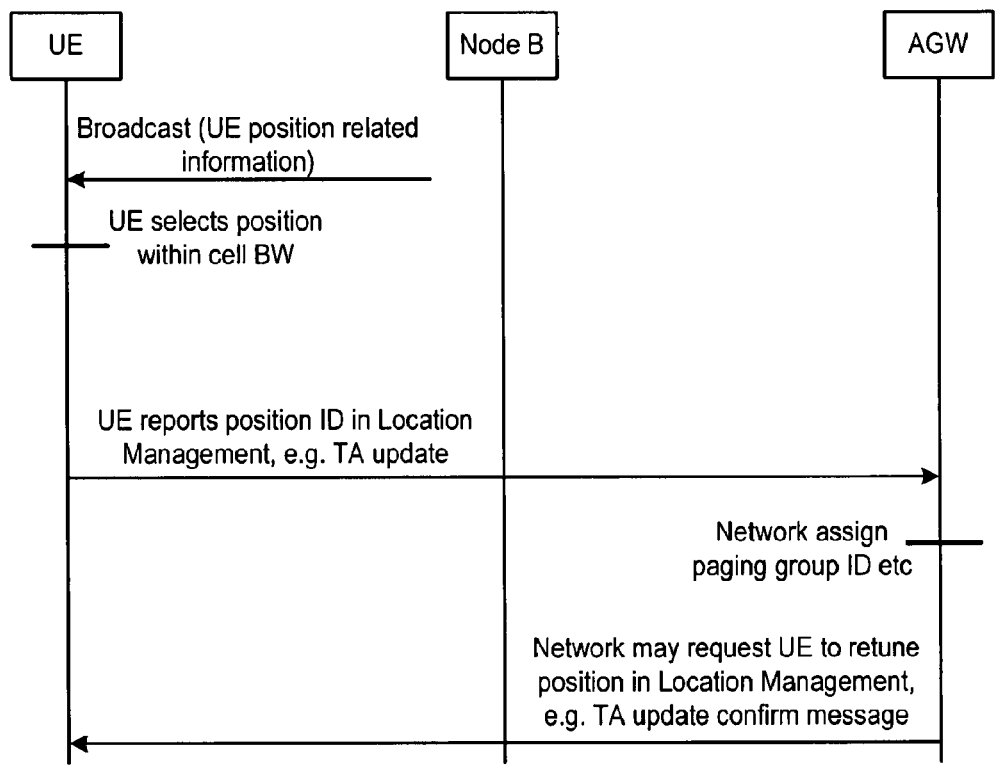
FIG. 4 illustrates the signalling for indicating and negotiating UE positions within the cell bandwidth.

After having retrieved a paging position for the user equipment in the frequency band, it is necessary to report the paging positions. The user equipment (in idle mode) selects a suitable paging position, e.g. by using any of the methods described above. Subsequently, the user equipment then reports, depending on the used position selection method, its paging position to the network (except for hash based rules). This is necessary because the network needs to know the frequency position at which the user equipment currently is camped before the network can send the page. The user equipment can indicate its paging position, e.g., in a location management message (e.g. tracking area update, cell update etc). The message may simply consist of an identity of the paging position, e.g. by applying an M-bit message to report $2.sup.M$ positions. However, it must be observed that the user equipment can move within the coverage area and, thus, may camp on to a new cell. Preferably, the user equipment shall maintain the same paging position at least in the same tracking area. However, in case the paging position of the user equipment within the cell bandwidth is different in the new cell compared to the old cell, the user equipment shall again indicate its new paging position the network. In response, the network shall send a paging indicator as well as a paging message to the new paging position in the frequency domain at which the user equipment is tuned. This means that user equipments in a particular paging position may be assigned the same group identity in case this group identity is used to address paging related information. The network also has the liberty to direct the user equipment to change its paging position. This could be done by sending the request to the user equipment in a location management message, e.g. tracking area update confirm, cell update confirm etc. The entire protocol operation is shown in FIG. 4. In said figure, the user equipment in idle mode or any low activity state receives a broadcast message 31 from the Node B with UE position-related information. The user equipment selects 32 its paging position within the cell transmission bandwidth and reports the paging position-ID in, e.g., a location management message 33. The network assigns 34 paging group ID and may request the user equipment to retune its paging position in a location management message 35.

The main benefit of the pre-defined rules is that the Core Network, e.g. the access gateway in E-UTRAN, does not need to inform the base station where to page the user equipment. It is already sufficient to inform the base station about the identity of the user equipment. If the base station has been supplied with the particular "rule", the base station can calculate itself at which paging position in the frequency domain the user equipment is camped. The base station will then send the paging for that particular user equipment at that particular paging position.

The applied "rule" should preferably not be hard-coded into the user equipment but rather be provided at the time when the user equipment attaches to the network. This allows to use the benefits of the usage of a network-controlled rule, e.g. to simplify an update of a hash function, which has turned out to have some bad properties. Secondly as stated earlier, this also provides a more flexible and efficient handling of the radio resources.

Although the above examples have mainly concentrated on a 40 MHz cell transmission bandwidth and a 20 MHz UE bandwidth, it will be appreciated by those skilled in the art that the present invention is equally applicable to any range of bandwidths and frequencies, as long as the UE bandwidth is smaller than the cell transmission bandwidth. One example is that of a 20 MHz bandwidth UE operating in a cell with 30 MHz bandwidth.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfill the functions of several units recited in the claims. Any reference signs in the claims shall not be construed so as to limit their scope.

The invention claimed is:

1. A method implemented by a user equipment (UE), the method comprising:
   the UE receiving a broadcast channel message, the broadcast channel message comprising an indication of a paging position in the frequency domain that is to be used by the UE to receive paging indications, wherein a bandwidth of the paging position in the frequency domain corresponds to a subset of a network transmission bandwidth in the frequency domain;
   the UE monitoring for paging indications at the paging position; and
   the UE receiving a paging indication at the paging position.

2. The method as in claim 1, further comprising the UE sending an indication that the UE has selected the first paging position to a base station.

3. The method as in claim 1, wherein there are a plurality of paging positions within the network transmission bandwidth.

4. The method as in claim 1, wherein the bandwidth of the paging position in the frequency domain is less than or equal to a reception bandwidth of the UE, and the reception bandwidth of the UE is less than the cell network transmission bandwidth in the frequency domain.

5. The method as in claim 1, further comprising the UE receiving a paging message at the first paging position.

6. The method as in claim 1, wherein multiple repetitions of the paging indication are received.

7. The method as in claim 1, wherein the paging indication is received while the UE is in idle mode.

8. The method as in claim 1, wherein a plurality of selection parameters included in the broadcast channel message correspond to probabilities, and each respective selection parameter corresponds to a respective probability for a respective paging position.

9. The method as in claim 1, wherein a plurality of selection parameters included in the broadcast channel message are associated with a non-uniform distribution of UEs across a plurality of paging positions.

10. The method as in claim 1, wherein each of a plurality of selection parameters included in the broadcast channel message have a common value resulting in a statistically uniform distribution of UEs across a plurality of paging positions.

11. A user equipment (UE) comprising:
    a receiver configured to receive a broadcast channel message, the broadcast channel message comprising an indication of a paging position in the frequency domain that is to be used by the UE to receive paging indications, wherein a bandwidth of the paging position in the frequency domain corresponds to a subset of a network transmission bandwidth in the frequency domain;
    a processor configured to:
      monitor, via the receiver, for paging indications at the paging position, and
      receive, via the receiver, a paging indication at the paging position.

12. The UE as in claim 11, wherein the are a plurality of paging positions within the network transmission bandwidth.

13. The UE as in claim 11, wherein the bandwidth of the paging position in the frequency domain is less than or equal to a reception bandwidth of the UE, and the reception bandwidth of the UE is less than the cell network transmission bandwidth in the frequency domain.

14. The UE as in claim 11, wherein the processor is configured to receive a paging message at the first paging position without having to re-tune the receiver after receiving the paging indication.

15. The UE as in claim 11, wherein multiple repetitions of the paging indication are received.

16. The UE as in claim 11, wherein the paging indication is received while the UE is in idle mode.

17. The UE as in claim 11, wherein a plurality of selection parameters included in the broadcast channel message correspond to probabilities, and each respective selection parameter corresponds to a respective probability for a respective paging position.

18. The UE as in claim 11, wherein a plurality of selection parameters included in the broadcast channel message are associated with a non-uniform distribution of UEs across the plurality of paging positions.

19. The UE as in claim 11, wherein each of a plurality of selection parameters included in the broadcast channel message have a common value resulting in a statistically uniform distribution of UEs across the plurality of paging positions.

20. A base station comprising:
- a transmitter configured to a broadcast channel message, the broadcast channel message comprising an indication of a paging position in the frequency domain that is to be used by a user equipment to receive paging indications, wherein a bandwidth of the paging position in the frequency domain corresponds to a subset of a network transmission bandwidth in the frequency domain; and
- a processor configured to:
    - send, via the transmitter, a paging indication to the user equipment at the paging position, and
    - send, via the transmitter, a paging message to the user equipment at the paging position.

\* \* \* \* \*

UNITED STATES PATENT AND TRADEMARK OFFICE
CERTIFICATE OF CORRECTION

PATENT NO. : 10,021,671 B2  
APPLICATION NO. : 15/643228  
DATED : July 10, 2018  
INVENTOR(S) : Muhammad Kazmi, Robert Baldemir and Magnus Stattin Page 1 of 1

It is certified that error appears in the above-identified patent and that said Letters Patent is hereby corrected as shown below:

In the Claims

Column 6, Line 2: delete "first"

Column 6, Line 14: delete "first"

Column 6, Line 56: delete "first"

Signed and Sealed this  
Eighth Day of January, 2019

Andrei Iancu  
*Director of the United States Patent and Trademark Office*